Figure 1:
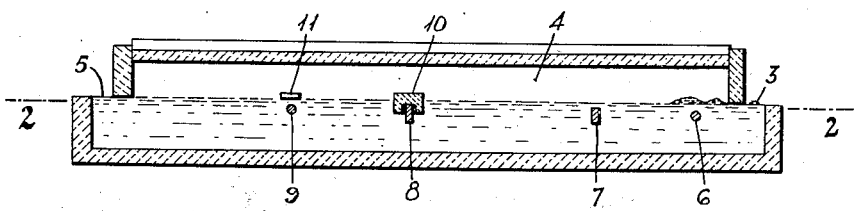

March 31, 1942.  E. V. BOREL  2,277,679
ELECTRIC FURNACE FOR MELTING GLASS
Original Filed Aug. 10, 1937

INVENTOR.
EDOUARD VIRGILE BOREL
BY
Richards & Geier
ATTORNEYS.

Patented Mar. 31, 1942

2,277,679

UNITED STATES PATENT OFFICE 2,277,679

ELECTRIC FURNACE FOR MELTING GLASS

Edouard Virgile Borel, Romont, Switzerland, assignor to Societe Anonyme des Manufactures des Glaces & Produits Chimiques de Saint-Gobain, Chauny & Cirey, Paris, France Original application August 10, 1937, Serial No. 158,347. Divided and this application May 6, 1940, Serial No. 333,568. In Germany August 14, 1936

8 Claims. (Cl. 13—6)

This invention relates to electric furnaces for making glass and refers more particularly to the heating of a glass mass in tank furnaces in which the material to be heated is supplied to one end of a tank furnace and finished glass is removed from the other end of the tank furnace, the glass mass being maintained at a substantially constant level within the tank furnace and flowing from one end thereof to the opposite end. The glass mass is heated within the tank furnace either totally or in part by an electrical current supplied by electrodes situated within the glass mass, the current flowing through the glass mass which acts as a resistance, so that it is heated by the Joule effect of the electrical current.

The present application is a division of my co-pending patent application, Serial No. 158,-347, filed August 10, 1937, now Patent No. 2,225,-616, relating to an electric furnace for melting glass.

In tank furnaces used for the continuous manufacture of glass, various materials in different stages of chemical composition are maintained at different temperatures in different parts of the furnace. Thus, there is a section at one end of the furnace where the raw materials are melted, an intermediate section where molten glass is fined at a higher temperature and a section at the opposite end of the furnace in which fined glass is cooled down to a suitable temperature.

It is well-known that the density of glass varies with its temperature and is a different one at different stages of its manufacture. The partly molten materials and incompletely fined glass are lighter than the finished glass and, therefore, float on the surface of the glass mass.

It was found that sometimes the lighter incompletely molten or fined glass is liable to be carried too far down the tank and is then mixed with the completely molten or fined glass, thereby affecting the quality of the glass.

It was also found, in some instances, that the side walls of the tank furnace are heated to an undesired extent and that this heat may cause a deterioration of the side walls.

An object of the present invention is to eliminate these drawbacks and to provide a tank furnace wherein partly molten or partly fined glass is effectively prevented from mixing with the completely molten or fined glass.

Another object is to provide a tank furnace wherein at least some portions of the side walls of the tank furnace are protected from excessive temperatures.

Other objects of the present invention will become apparent in the course of the following specification.

The objects of the present invention may be realized through the provision of a tank furnace comprising electrodes which are immersed in the glass mass to supply the electrical current to said glass mass, at least one of these electrodes being, according to my co-pending application Ser. No. 158,347, entirely immersed in and across the path of the glass flow between the points of insertion of the materials to be heated and of removal of the glass, and extending substantially over the entire width of said glass flow. According to the present invention at least one of such electrodes entirely immersed in and across the glass flow and extending over the entire width of said glass flow is combined with a refractory member in order to control the distribution of the electrical current lines flowing from this electrode to another electrode through the glass mass and the passage of the glass flow in the neighbourhood of the electrode.

In particular, this refractory member may be placed above said electrode which is located across the entire width of the glass flow, in such a manner as to form above the electrode a baffle extending substantially over the entire width of the tank. For example this baffle may extend from the electrode to above the surface of the glass mass. This refractory member constituting a baffle across the entire width of the furnace will avoid the passage above this electrode of partly molten or partly fined glass while the heavier fully molten or fined glass is able to pass under the electrode.

The electrode or electrodes associated with the refractory member may be placed at any depth in the bath at which it is specially desired to introduce the current for heating the glass while avoiding the passage above the electrode or electrodes of partly molten or partly fined glass.

Said electrode or electrodes may be situated close to the upper surface of the glass mass in order to create a more heated zone in the upper layer of the glass mass where the lighter partly molten or fined glass is confined.

It may also be advantageous to give to this electrode a surface of contact with the glass mass which is smaller than the cross section of the glass flow between this electrode and another electrode of another phase in order to produce a concentration of the electrical current lines close to this electrode and consequently a more heated zone around this electrode. Thus the partly molten or fined material reaching the electrode will rapidly become fully molten when in the neighbourhood of this electrode and of the associated baffle. The surface of contact of at least one of the electrodes with the glass mass may be, for example, smaller than one-half the cross-sectional area of the current of glass flowing between the electrodes. Good results have been obtained with electrodes having a contact surface equal to approximately one-third of the cross-sectional area of the current of glass.

In the furnace according to the invention, the other electrodes, for example, may also be totally submerged in the glass and located in and across the path of the glass flow so that the direction of the electric current flow from one electrode to another is substantially parallel to the glass flow.

A plurality of electrodes may be located at different positions along the length of the furnace, so as to form a plurality of heating zones distributed along the length of the furnace, of which at least one zone is separated from an adjacent zone in respect of surface flow by the refractory member constituting a baffle.

Preferably, the electrode covered by this baffle is situated in the zone of the tank following the fining zone in order to avoid the passage of partly fined or partly molten glass to the working zone of the furnace. With the baffle in this position, the fined glass, which is heavier than the unfined particles has no difficulty in passing under the combined baffle and electrode.

The refractory members may also be in form of jackets enclosing those portions of the electrode which are situated closest to the side walls. Thus an excessive heating of the side walls is avoided as the electrical current flowing through the glass mass is concentrated, in the neighborhood of this electrode, in the middle part of the furnace comprised between the inner ends of the jackets.

The invention will appear more clearly from the following detailed description, when taken in connection with the accompanying drawing, showing by way of example a preferred embodiment of the inventive idea.

Figure 2:
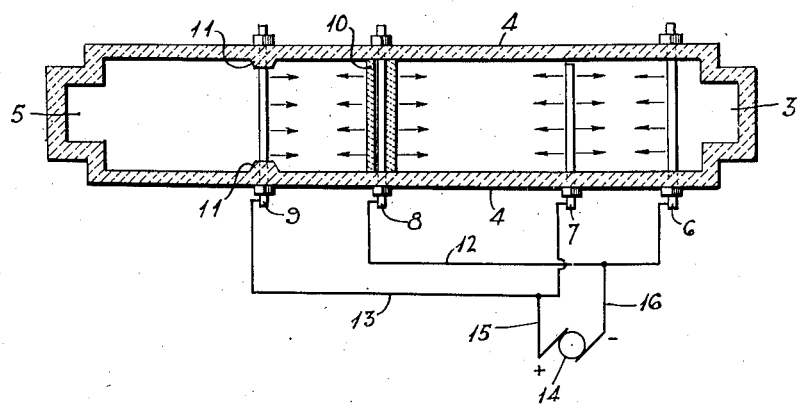

In the drawing:

Figure 1 is a longitudinal, vertical section through a tank furnace constructed in accordance with the principles of the present invention; and Figure 2 is a horizontal section along the line 2—2 of Figure 1.

Raw materials are introduced into the furnace illustrated in the drawing through the opening 3 and the glass mass within the furnace flows between the side walls 4 toward the end 5 from which the finished glass is extracted. The electrodes 6, 7, 8 and 9 are placed in and across the path of the glass flow, so that the glass mass flows past the electrodes, and the direction of the electrical current from one electrode to another, as indicated by the arrows, is substantially parallel to that of the glass flow.

The electrodes 6 to 9 of the furnace should be totally submerged in the glass mass, since any part of an ordinary electrode which extends above the surface of the glass becomes burnt or corroded; preferably, the electrodes extend through openings provided in the side walls 4 of the furnace. The electrode 7 of a length substantially equal to the width of the furnace, may be inserted through an opening provided in one side wall of the furnace, or two electrode elements constituting a single electrode 6 or 9 may be inserted through two openings facing one another and provided in both side walls of the furnace.

To avoid the flow of incompletely treated glass from one zone of the furnace to another zone, a refractory member 10 is located above the electrode 8 and extends from that electrode to above the surface of the glass mass. The member 10 may be carried by the electrode itself or may be maintained in the required position by bosses or jackets, by the side walls 4 of the tank furnace, or by any other suitable means.

Any partly molten material reaching the electrode 8 and floating on the surface of the glass bath is stopped by the refractory member 10, while the heavier, fully molten glass mass is able to pass under the electrode. The floating partly molten glass mass will be fully melted by the heat of the zone surrounding the electrode 8 and then it is able to flow under the electrode.

The glass stream flowing from one end to the other end of the furnace passes the vertical planes containing the electrodes 6 to 9 which are placed transversely of the furnace and of the direction of the glass flow; each element of the stream at any given level across the width of the furnace becomes equally heated in its passage through the zones between the electrodes. The electrodes may be placed so as to provide hot zones of any desired length and in any desired position along the path of the glass flow.

An excessive heating of the side walls 4 of the tank furnace by electrode 9 is prevented through the use of jackets or bosses 11 which surround portions of the electrode 9, thus limiting transversely of the tank the extent of the hot zone created by the electrode. Through the use of the jackets 11, it is thus possible to control the distribution of the lines of the electrical current flowing from the electrode and through the glass mass and particularly to concentrate the lines of the electrical current in the middle part of the furnace.

It is apparent that the specific illustrations shown above have been given by way of illustration and not by way of limitation and that the structures above described are subject to wide variation and modification without departing from the scope or intent of the invention. All of such variations and modifications are to be included within the scope of the present invention.

What is claimed is:

1. In a tank furnace for treating glass, wherein a mass of glass in different states of chemical composition is maintained at a substantially constant level, the materials to be treated being introduced at one end of the tank and glass in the finished state being removed from the opposite end of the tank, the combination therewith of electrodes immersed in the glass mass to supply electrical current to the glass mass in order to heat it by Joule effect, at least one of the electrodes being totally submerged in the glass, located in and across the path of the glass flow and extending substantially over the entire width of the furnace in spaced relation to the transverse walls of the latter, and at least one refractory member extending transversely of the furnace in the plane of and close to said electrode and contacting the glass to control the glass flow and the distribution of lines of electrical current flowing from said electrode through a portion of the glass mass.

2. In a tank furnace for treating glass wherein a mass of glass in different states of chemical composition is maintained at a substantially constant level, the materials to be treated being introduced at one end of the tank and glass in the finished state being removed from the opposite end of the tank, the combination therewith of electrodes immersed in the glass mass to supply electrical current to the glass mass in order to heat it by Joule effect, at least one of the electrodes being completely immersed in the glass mass, and located in and across the path of the glass flow, and extending substantially over the entire width of the furnace in spaced relation to the transverse walls of the latter, and a refractory member extending transversely of the furnace and contacting a part of said electrode between the side walls of the furnace.

3. In a tank furnace for treating glass, wherein a mass of glass in different states of chemical composition is maintained at a substantially constant level, the materials to be treated being introduced at one end of the tank and glass in the finished state being removed from the opposite end of the tank, the combination therewith of electrodes immersed in the glass mass to supply electrical current to the glass mass in order to heat it by Joule effect, at least one of said electrodes being completely immersed in the glass mass and located in and across the path of the glass flow and extending over substantially the entire width of the glass flow in spaced relation to the transverse wall of the furnace, and a refractory member extending transversely of the furnace and upwardly from the electrode to above the surface of the glass mass and across substantially the entire width of the furnace.

4. In a tank furnace for treating glass, wherein a mass of glass in different states of chemical composition is maintained at a substantially constant level, the materials to be treated being introduced at one end of the tank and glass in the finished state being removed from the opposite end of the tank, the combination therewith of electrodes immersed in the glass mass to supply the electrical current to the glass mass in order to heat it by Joule effect, at least one of said electrodes being rod-like and completely immersed in the glass mass, and located horizontally in and across the path of the glass flow, and extending over substantially the entire width of the furnace, and an elongated refractory member mounted upon said electrode and extending above the surface of the glass mass and across substantially the entire width of the furnace.

5. In a tank furnace for treating glass, wherein a mass of glass in different states of chemical composition is maintained at a substantially constant level, the materials to be treated being introduced at one end of the tank and glass in the finished state being removed from the opposite end of the tank, the combination therewith of electrodes immersed in the glass mass to supply electrical current to the glass mass in order to heat it by Joule effect, at least one of said electrodes being completely immersed in the glass mass, extending across substantially the entire width of the tank, and at least one refractory jacket enclosing a portion of said electrode adjacent a side wall of the tank.

6. In glass making apparatus wherein a fluid mass to be treated flows from one end of a furnace to the other, at least two electrodes in said furnace, a source of electrical energy, means connecting said electrodes to said source whereby electrical current is caused to flow through said mass between said electrodes, at least one of said electrodes being completely immersed in the glass mass and extending horizontally in and across the path of the glass flow and across substantially the entire width of the furnace, and an elongated refractory member adjacent said last-named electrode in contact with the glass mass and extending above the surface thereof across substantially the entire width of the furnace.

7. In glass making apparatus wherein a fluid mass to be treated flows from one end of a furnace to the other, at least two electrodes in said furnace, a source of electrical energy, means connecting said electrodes to said source whereby electrical current is caused to flow through said mass between said electrodes, at least one of said electrodes being elongated and completely immersed in the glass mass and extending horizontally in and across the path of the glass flow, and refractory sleeves surrounding opposite ends of said last-named electrode to space the portion thereof in contact with the mass from the side walls of the furnace.

8. In glass making apparatus wherein a fluid mass to be treated flows from one end of a furnace to the other, means for heating and controlling the flow of said mass through said furnace, said means including a source of electrical energy, an elongated electrical conductor extending transversely across substantially the entire width of said furnace in and across the flow path of said mass near the surface of the latter, means operatively connecting said conductor to said source, and a refractory member immediately above said conductor and extending into and above said mass across the entire width of said furnace.

EDOUARD VIRGILE BOREL.